United States Patent [19]

Suzuki

[11] Patent Number: 5,581,386

[45] Date of Patent: Dec. 3, 1996

[54] METHOD OF TERMINAL CONTROL SIGNAL TRANSMISSION AND PHOTONIC SWITCHING SYSTEM INCORPORATING SAID METHOD

[75] Inventor: Syuji Suzuki, Tokyo, Japan

[73] Assignee: NEC Corporation, Tokyo, Japan

[21] Appl. No.: 451,223

[22] Filed: May 26, 1995

Related U.S. Application Data

[63] Continuation of Ser. No. 913,044, Jul. 14, 1992, abandoned.

[30]      Foreign Application Priority Data

Jul. 29, 1991   [JP]   Japan ..................... 3-212774

[51] Int. Cl.$^6$ .......................... H04J 14/00; H04B 10/16
[52] U.S. Cl. ................... 359/117; 359/128; 359/139; 359/179
[58] Field of Search ..................... 359/117, 128, 359/139, 188, 174–177, 180, 181, 179

[56]                References Cited

U.S. PATENT DOCUMENTS

| | | | |
|---|---|---|---|
| 4,736,462 | 4/1988 | Joel ........................................ | 359/164 |
| 4,783,850 | 11/1988 | MacDonald ............................ | 359/128 |
| 4,807,227 | 2/1989 | Fujiwara ................................. | 359/164 |
| 5,383,046 | 1/1995 | Tomofuji ................................ | 359/176 |
| 5,416,628 | 5/1995 | Betti ....................................... | 359/181 |
| 5,420,868 | 5/1995 | Chraplyvy ............................. | 359/188 |

FOREIGN PATENT DOCUMENTS

| | | | |
|---|---|---|---|
| 0436958 | 7/1991 | European Pat. Off. ............... | 359/117 |
| 54-88709 | 7/1979 | Japan . | |
| 0187431 | 8/1986 | Japan ..................................... | 359/188 |
| 0274532 | 12/1986 | Japan ..................................... | 359/188 |
| 0231579 | 10/1987 | Japan ..................................... | 359/117 |
| 0126095 | 5/1989 | Japan ..................................... | 359/128 |
| 0223837 | 9/1989 | Japan ..................................... | 359/188 |

OTHER PUBLICATIONS

"Optical Switching in Telecommunications Networks", *SPIE*, vol. 1141 5th European Conference on Integrated Optics: ECIO '89, Nick Parson and Nigel Whitehead.

"A 565 MBit/s Line Equipment for Single–Mode Optical Waveguides", *IEEE International Conference on Communications*, CH 2028–9/84/0000–0783, May 1984, Jurgen Gier and Baldur Stummer.

"A High Capacity Metropolitan Area Network Using Lightwave Transmission and Time–Multiplexed Switching", *IEEE Transactions on Communications*, vol. 38, No. 10, Oct. 1990, Anthony Acampora.

"Method for Interconnecting Present and Future Optical Networks Via Switches", *IBM Technical Disclosure Bulletin*, vol. 32, No. 12, May 1990.

*Primary Examiner*—Leslie Pascal
*Attorney, Agent, or Firm*—Foley & Lardner

[57]            ABSTRACT

The present invention provides a method for transmitting terminal connection control signals and supervisory signals between a photonic switching system and its subscriber terminals without using any light source in the photonic switching system. After modulating amplitude of the photonic communications signals by the terminal connection control signals in the form of electric signals the photonic communications signals are inputted to the subscriber terminals to be demodulated for regenerating the terminal connection control signals.

11 Claims, 5 Drawing Sheets

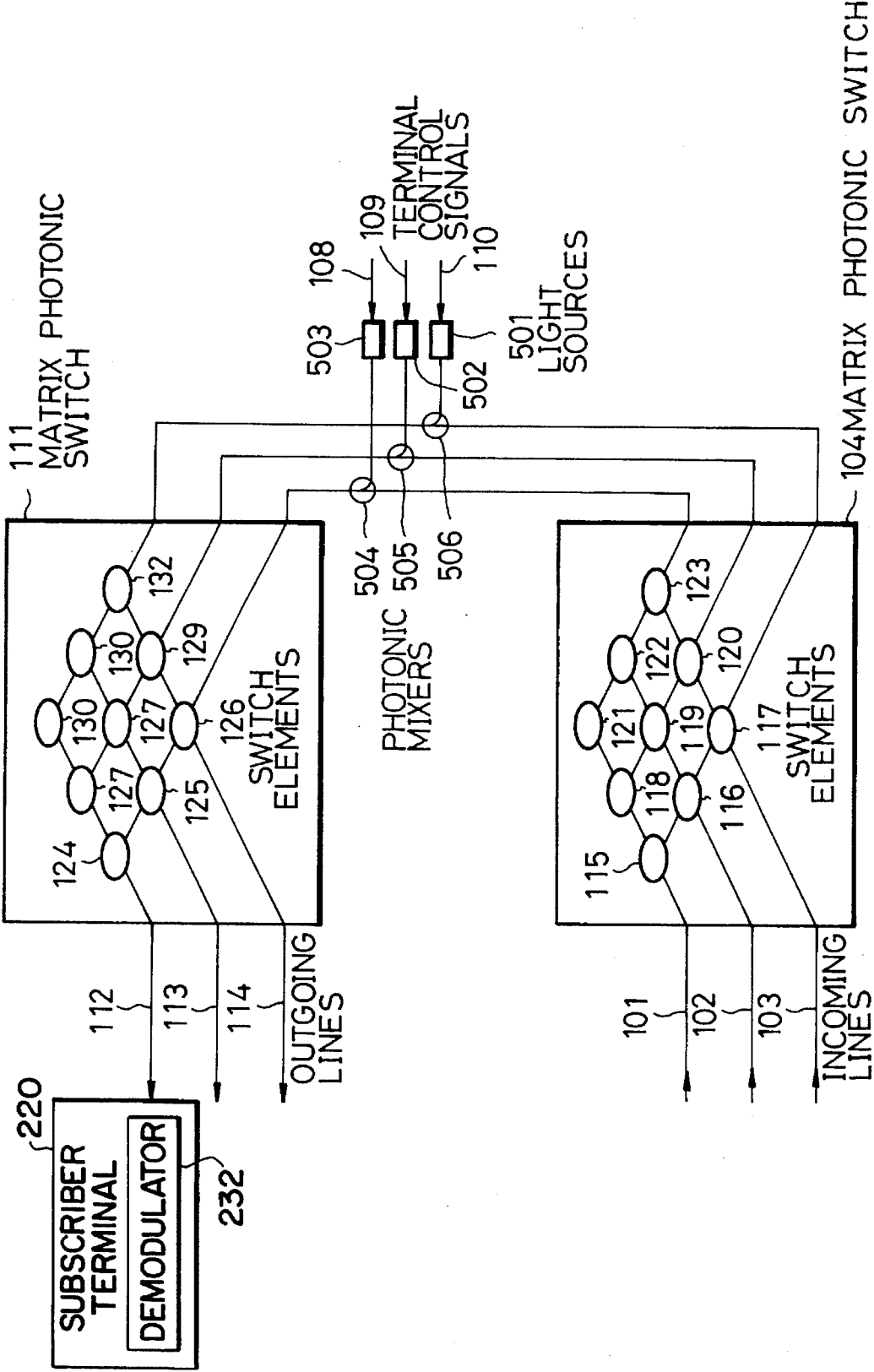

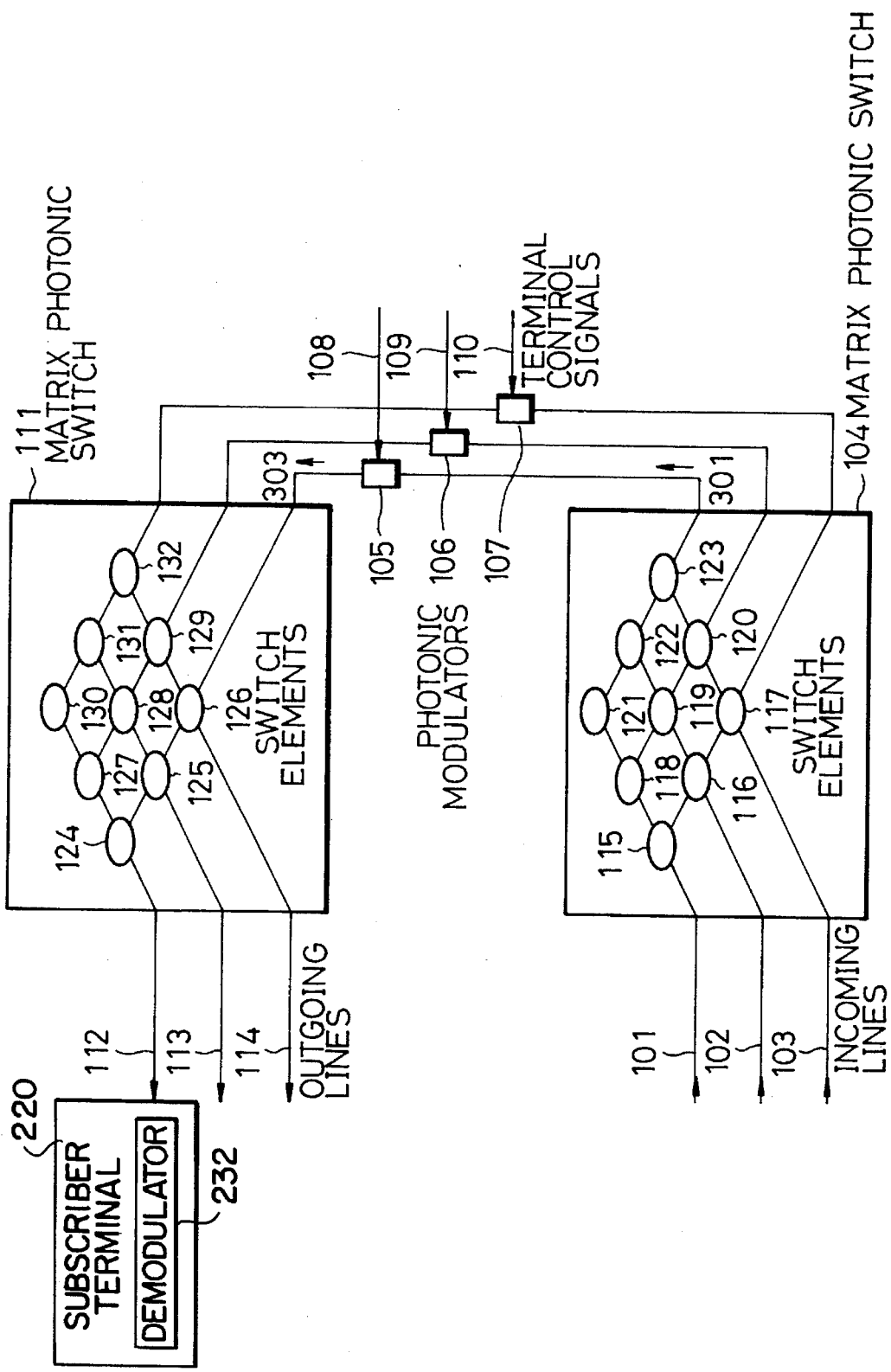

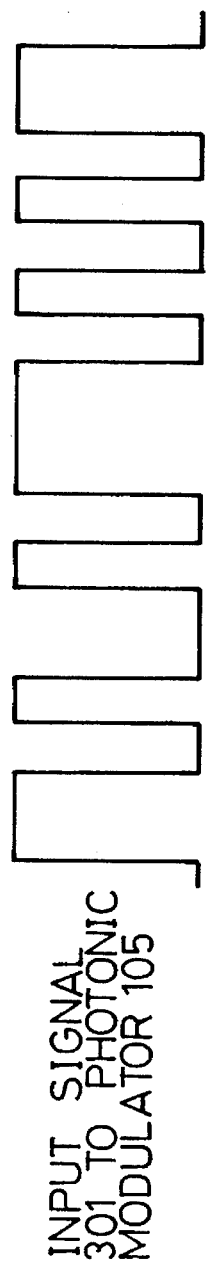
FIG.4(a) INPUT SIGNAL 301 TO PHOTONIC MODULATOR 105
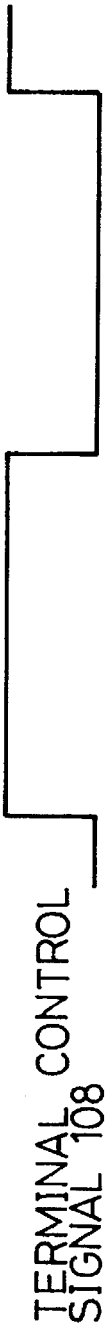
FIG.4(b) TERMINAL CONTROL SIGNAL 108
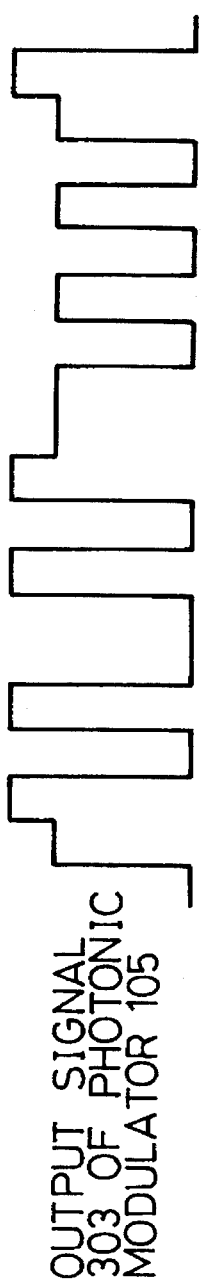
FIG.4(c) OUTPUT SIGNAL 303 OF PHOTONIC MODULATOR 105

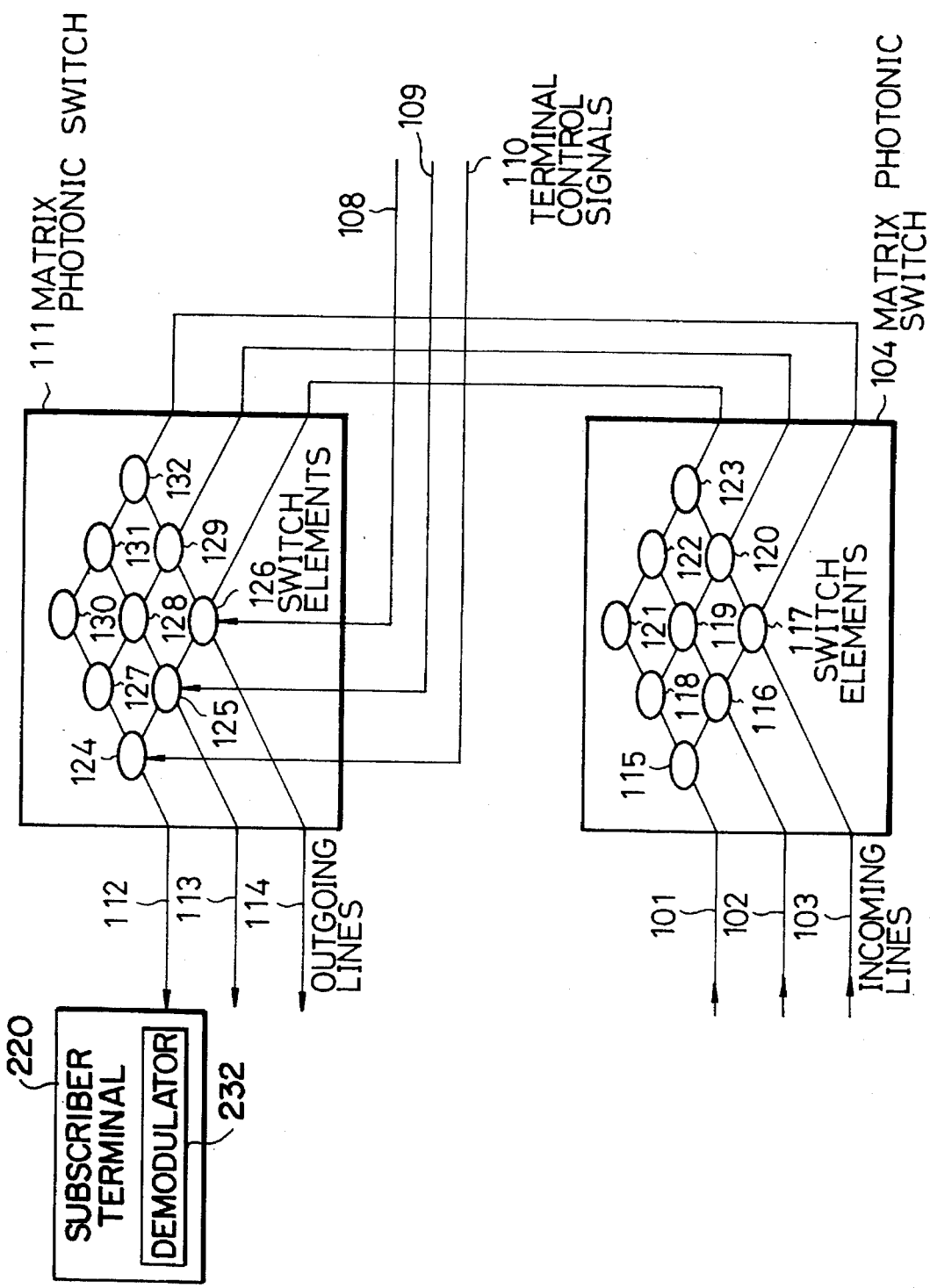

METHOD OF TERMINAL CONTROL SIGNAL TRANSMISSION AND PHOTONIC SWITCHING SYSTEM INCORPORATING SAID METHOD

This application is a continuation of application Ser. No. 07/913,044, filed Jul. 14, 1992, now abandoned.

BACKGROUND OF THE INVENTION

1. Field of the Invention

The present invention relates to a photonic switching system to be applied to communications with wide frequency band such as TV, video lecturing and video telephones, and a method for transmitting control signals of said system, in particular, a method for transmitting terminal control signals between a photonic switching system and a subscriber terminal.

2. Description of Related Art

Optical fiber communications engineering has recently made great progress and its scope of application is spreading widely; however, aiming for a more advanced system, studies have been developing in the field of photonic switching systems to switch photonic signals without converting to electric signals.

In photonic switching systems in addition to photonic communications signals, it is necessary to transmit various control signals, such as control and supervisory signals for call connection between photonic switching system and subscriber terminals, control signals being transmitted during the communications and disconnection supervisory signals.

Hitherto, concerning the transmission method of switching connection control signals between photonic switching systems, "Photonic Switching System" recorded in Japanese Patent Laid-open No. 88709/1979 was known to people skilled in this engineering field; however, this system regenerates the switching connection control signals included in part of frequency band of photonic communications signals by converting branched photonic communications signals to electric signals and by filtering them through a low pass filter or a narrow-band pass filter.

FIG. 1 is a partial block diagram showing the main portion of a conventional photonic switching system. A photonic communications signal inputted to a photonic switching system through one of incoming lines 101 to 103 is switched by matrix photonic switch 104 composed of switching elements 115 to 123 and inputted into one of photonic mixers 504–506, for instance, photonic mixer 504 through switch element 123. Subscriber terminal connection control signal 108, in the form of an electric signal to be transmitted from the photonic switching system to subscriber terminal is mixed with the photonic communications signal by photonic mixer 504, after being converted to a photonic signal through light source 503. Output light from photonic mixer 504, is switched by means of matrix photonic switch 111 consisting of switching elements 124 to 132 and transmitted to a subscriber terminal through predetermined outgoing line 112, for example. Thus subscriber terminal connection control signals (hereinafter referred to as "terminal control signals") 108, 109, 110 are transmitted to subscribers together with photonic communication signals via outgoing lines 112, 113, 114.

The outgoing photonic communications signals sent, for example, via outgoing line 112 to, for example, subscriber terminal 220, are subsequently regenerated by demodulator 232 within subscriber terminal 220.

In the conventional transmission method of terminal control signals, expensive light sources 501, 502, 503 are necessary for the photonic switching system. Thus the conventional transmission method of transmitting the terminal control signals has the problem that it requires a light source for the photonic switching system and which consequently increases the cost of the photonic switching system.

SUMMARY OF THE INVENTION

An object of the present invention is to provide a method for transmitting terminal control signals which function as a subscriber terminal connection control and supervisory signals without any light source for a photonic switching system.

To achieve the object described above the method according to the present invention for transmitting terminal control signals which are used for controlling and supervising the subscriber terminal connection of calls between a photonic switching system and its subscriber terminals having a photonic modulator and demodulator for communicating the photonic communications signals, comprising the steps of:

modulating outgoing photonic communications signals by the terminal control signals in the form of electric signal at said photonic switching system:

regenerating the terminal control signals by demodulating and incoming photonic communications signals at the subscriber terminal.

The method described above can include a method whose modulation and demodulation are performed by means of a photonic amplitude modulator and demodulator.

The method described above can also include a method whose modulation of the photonic communications signals is performed by overlapping the terminal control signals on the connection control signal of the photonic switch of the photonic switching system and transmitting the modified photonic communications signals from the photonic switching system with amplitude corresponding to the terminal control signals of the photonic switching system.

To achieve the object described above, the photonic switching system according to the invention provides means for transmitting the terminal control signals which are used for controlling the subscriber terminal connection of call between the photonic switching system and its subscriber terminals, the means modulating outgoing photonic communications signals by the terminal control signals in the form of electric signal, at the photonic switching system;

means for regenerating the terminal control signals by demodulating the received photonic communications signals at the subscriber terminals.

The photonic switching system described above can include the follows means:

The means for modulating the photonic communications signals by the terminal control signals which means is a photonic amplitude modulator provided at the switching network of the photonic switching system, and the means for regenerating the terminal control signals is an photonic amplitude demodulator provided in the subscriber terminal, the means for modulating the photonic communications signals by the terminal control signals, which means is a circuit to overlap the terminal control signals on the connection control signals of the photonic switching network making amplitude of the photonic communications signals correspond to the terminal control signals.

Other and further objects, features and advantages of the invention will appear more fully from the following description.

BRIEF DESCRIPTION OF THE DRAWINGS

FIG. 1 is a partial block diagram showing the main portion of a conventional photonic switching system.

FIG. 2 is a partial block diagram showing a first embodiment of the photonic switching system of the present invention.

FIG. 4 shows signal waveform diagrams related to photonic modulator 105 shown in FIG. 2, (a) is waveform of inputted photonic communications signal 301 to photonic modulator 105, (b) is an waveform of terminal control signal 108 and (c) is waveform of outputted photonic signal 303 from modulator 105.

FIG. 5 is a partial block diagram of a second embodiment of the photonic switching system of the present invention.

DESCRIPTION OF THE PREFERRED EMBODIMENTS

Figure 3A:
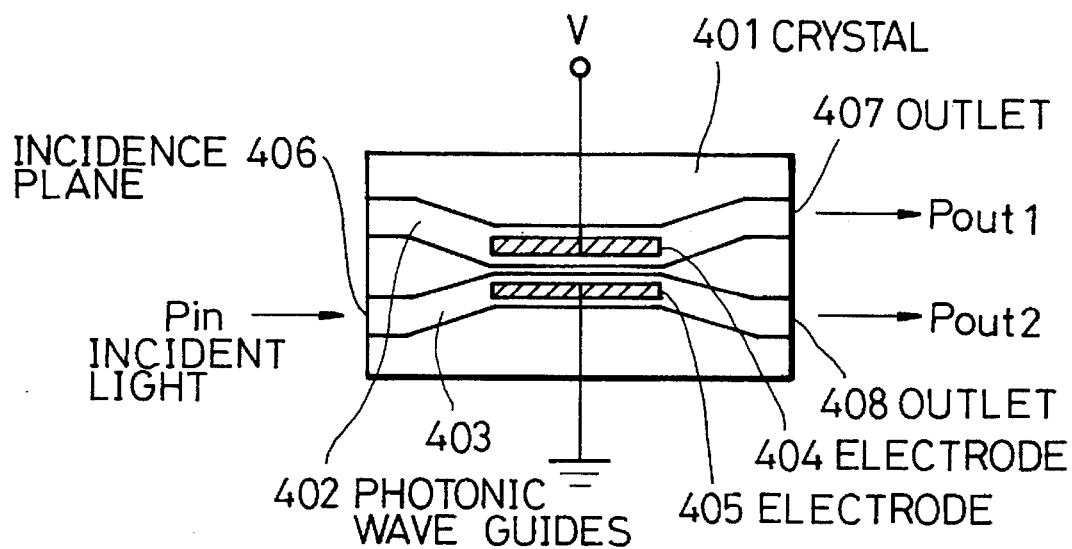
FIG. 3 is a typical plan showing an embodiment of photonic modulators 105, 106, 107 shown in FIG. 2, where (a) is a typical plan of the photonic modulator using a photonic switch element, (b) is a characteristic diagram of the photonic switch element.

FIG. 2 is a block diagram of the principal part of a photonic switching system in which a first embodiment of the transmission method of the terminal control signal of the present invention is applied.

Photonic communications signals inputted to the photonic switching system through one of incoming lines 101, 102, 103 are switched by matrix photonic switch 104 and inputted into one of photonic modulators 105, 106, 107. Photonic modulators 105, 106, 107 perform delicate amplitude modulation of the inputted photonic communications signals by terminal control signals 108, 109, 110. Output light from photonic modulators 105 106, 107 is switched by matrix photonic switch 111 and transmitted to a subscriber terminal, such as subscriber terminal 220 through outgoing lines 112, 113, 114. The subscriber terminal can regenerate terminal control signals 108, 109, 110 by demodulating via demodulators 232 and detecting variations of amplitude of the transmitted photonic communications signals.

Figure 3B:
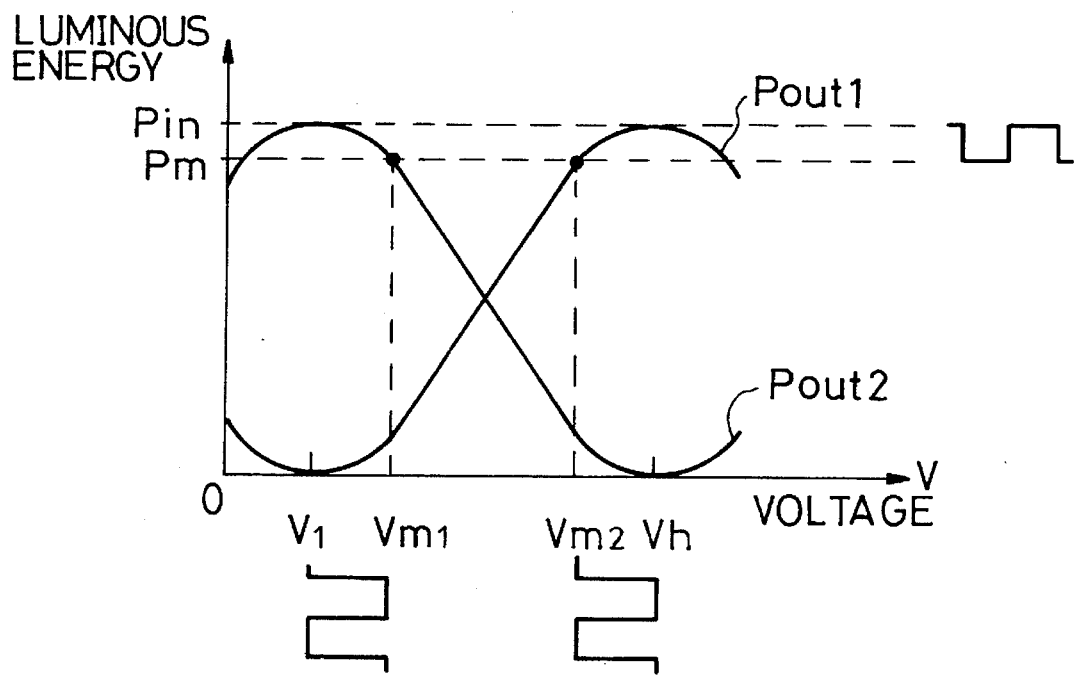

FIG. 3(a) is a typical plan showing the structure of an embodiment of photonic modulators 105, 106, 107 shown in FIG. 2 to which a photonic switch element is applied, while FIG. 3(b) is a characteristic diagram of the photonic switch.

As shown in FIG. 3(a), this photonic switch is constructed of photonic wave guides 402 and 403 positioned closely on crystal 401 which has an electrophotonic effect. Crystallized lithium niobate is used as the material of crystal 401 and photonic wave guides 402 and 403 can be formed by diffusing Ti on crystal 401. When an incident light with luminous energy $P_{in}$ is inputted in this photonic switch through incidence plane 406 of photonic wave guide 403 and voltage V between electrodes 404 and 405 provided respectively on photonic wave guides 402 and 403 is changed, the ratio of luminous energy $P_{out1}$ of outgoing light from outlet 407 of photonic wave guide 402 to a luminous energy $P_{out2}$ of outgoing light from outlet 408 of photonic wave guide 403 varies in accordance with voltage V.

FIG. 3(b) shows variations in luminous energy $P_{out1}$ and $P_{out2}$ at outlets 407 and 408 corresponding to voltage V. The sum of luminous energy $P_{out1}$ and $P_{out2}$ is constant being almost equal to luminous energy $P_{in}$ of incident light from incidence plane 406. When $V=V_1$ and $P_{out1}=0$, then $P_{out2}=P_{in}$, and when $V=V_h$ and $P_{out1}=P_{in}$ then $P_{out2}=0$.

The photonic modulator can be used in two ways. A first use is to utilize the output light from outlet 407 which is varied between the luminous energy $P_m$ and $P_{in}$ changing voltage V between $V_{m2}$ and $V_h$ according to the terminal control signals, while a second use is to utilize outlet 408 varied between luminous energy $P_m$ and $P_{in}$ changing voltage V between $V_1$ and $V_{m1}$ according to the terminal control signals.

FIG. 4 signal waveform is related to the operation of photonic modulator 105. Photonic communications signal 301 is inputted into photonic modulator 105 whereby the amplitude of photonic communications signal 301 is modulated according to terminal control signal 108. Consequently, the waveform of output light signal 303 transmitted from photonic modulator 105 becomes equal to that of photonic communications signal 301 whose amplitude is modulated according to terminal control signal 108, and hence the subscriber terminal which receives output signal 303 can regenerate the terminal control signal by detecting amplitude variation of output signal 303.

As described above, in the first embodiment of the present invention, the terminal control signal can be transmitted to the subscriber terminal without the need for converting to photonic signals using a light source in the photonic switching system.

FIG. 5 is a partial block diagram of the photonic switching system to which the second embodiment of the transmission method of the terminal control signals according to the present invention is applied, wherein the portions having the same numerals as in FIG. 2 are the same as those shown in FIG. 2. In this embodiment, terminal control signals 108, 109, 110 are inputted on switch elements 124, 125, 126 placed in matrix photonic switch 111. In this case, photonic communications signals inputted into incidence plane 406 (FIG. 3(a)) can be transmitted through either outlet 407 or 408 of switching elements 124, 125, 126 according to the inputted voltage due to the switching conditions as shown in FIG. 3. When the photonic communications signals are outputted from outlet 407, amplitude thereof can be varied according to the terminal control signals by changing applied voltage between $V_{m2}$ and $V_h$ in accordance with the terminal control signals. When the photonic communications signals are outputted from outlet 408, amplitude thereof is varied according to the terminal control signals by changing the applied voltage between $V_1$ and $V_{m1}$. Thus the terminal control signals can be transmitted to the subscriber terminal such as subscriber terminal 220 containing demodulator 232, without converting to photonic signals using any light source or a photonic modulator in the photonic switching system in the second embodiment of the present invention.

As many apparently widely different embodiments of this invention may be made without departing from the spirit and scope thereof, it is to be understood that the invention is not limited to the specific embodiments thereof except as defined in the appended claims.

What is claimed is:

1. A method for transmitting subscriber terminal control signals, the subscriber terminal control signals being used to control and supervise call connections between a photonic switching system and each of a plurality of subscriber terminals, each subscriber terminal including a photonic demodulator, the method comprising the steps of:

modulating a photonic carrier which has previously been modulated by communications signals by the subscriber terminal control signals through amplitude modulation at the photonic switching system; and regenerating the subscriber terminal control signals through amplitude demodulation of the modulated photonic communications signals at the subscriber terminal.

2. A method for transmitting subscriber terminal control signals, the subscriber terminal control signals being used to control and supervise call connections between a photonic switching system and each of a plurality of subscriber terminals, each subscriber terminal including a demodulator, the method comprising the steps of:

superimposing, at the photonic switching system, the subscriber terminal control signals on a photonic carrier which was previously modulated by communications signals; and regenerating the subscriber terminal control signals through amplitude demodulation of the photonic communications signals at the subscriber terminal.

3. A photonic switching system accommodating a plurality of subscriber terminals comprising:

means, at the photonic switching system, for modulating an outgoing photonic carrier which was previously modulated by communications signals by subscriber terminal control signals, the subscriber terminal control signals being used to control and supervise call connections between the photonic switching system and the subscriber terminals; and means, at each subscriber terminal, for regenerating the subscriber terminal control signals by demodulating the received photonic communications signals through amplitude demodulation.

4. A photonic switching system accommodating a plurality of subscriber terminals comprising:

means, at the photonic switching system, for superimposing subscriber terminal control signals on a photonic carrier which was modulated by communications signals; and means for regenerating the subscriber terminal control signals by demodulating received photonic communications signals through amplitude demodulation at the subscriber terminals.

5. A method for transmitting subscriber terminal control signals, the subscriber terminal control signals being used to control and supervise call connections between a photonic switching system and each of a plurality of subscriber terminals, each subscriber terminal including a photonic demodulator, the method comprising the steps of:

applying, via amplitude photonic modulation within the photonic switching system, subscriber terminal control signals to a photonic communication signal, the photonic communication signal being a photonic carrier which has been modulated by a communication signal; and regenerating the subscriber terminal control signals through amplitude photonic demodulation of the modulated photonic communication signal at the subscriber terminal.

6. A method for transmitting subscriber terminal control signals, the subscriber terminal control signals being used to control and supervise call connections between a photonic switching system and each of a plurality of subscriber terminals, each subscriber terminal including a demodulator, the method comprising the steps of:

superimposing, via amplitude modulation in a photonic switch, the subscriber terminal control signals onto an outgoing photonic communication signal, the outgoing photonic communication signal being a photonic carrier which has been modulated by a communication signal; and regenerating the subscriber terminal control signals through amplitude photonic demodulation of the modulated outgoing photonic communication signal at the subscriber terminal.

7. A photonic switching system accommodating a plurality of subscriber terminals comprising:

means for applying, via amplitude photonic modulation by a photonic modulator within an electronic switching system, subscriber terminal control signals to a photonic communication signal, the photonic communication signal being a photonic carrier which has been modulated by a communication signal; and means for regenerating the subscriber terminal control signals through amplitude photonic demodulation of the modulated photonic communication signal at the subscriber terminal.

8. A photonic switching system accommodating a plurality of subscriber terminals comprising:

means for applying, via amplitude photonic modulation in a photonic switch, subscriber terminal control signals to an outgoing photonic communication signal, the outgoing photonic communication signal being a photonic carrier which has been modulated by a communication signal; and means for regenerating the subscriber terminal control signals through amplitude photonic demodulation of the modulated outgoing photonic communication signal at the subscriber terminal.

9. A method of photonic communication, comprising:

a first modulating step external to a photonic switching system to modulate a photonic carrier by communication signals;

a second modulating step within the photonic switching system, to modulate the modulated photonic carrier by subscriber terminal control signals; and a regenerating step at a subscriber terminal, to recover the subscriber terminal control signals.

10. A method as recited in claim 15, wherein the second modulating step comprises amplitude modulation, and the regenerating step comprises amplitude demodulation.

11. A method as recited in claim 9, wherein the second modulating step comprises a step of superimposing the subscriber terminal control signals onto a switching control signal.

* * * * *